July 18, 1950      C. AMBRETTE      2,515,684
CONTINUOUS DRIER FOR LONG ALIMENTARY PASTE PRODUCTS
Filed May 14, 1946      5 Sheets-Sheet 1

INVENTOR.
Conrad Ambrette,
BY George D. Richards
Attorney

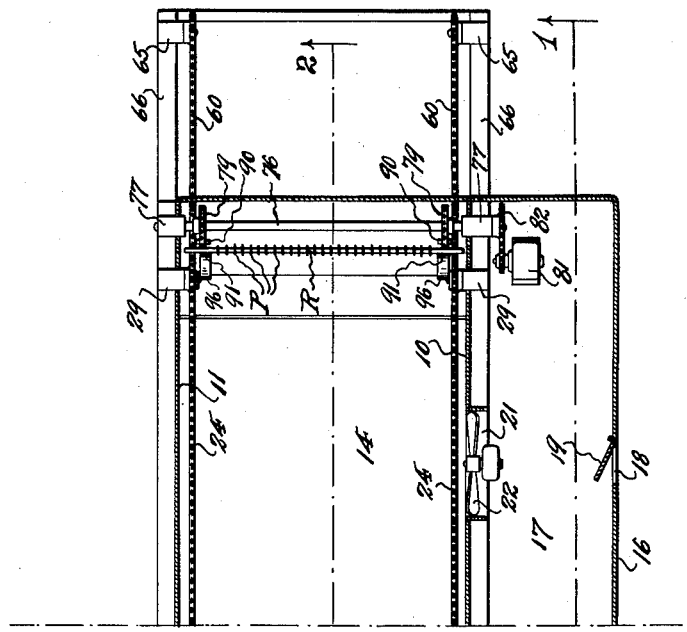
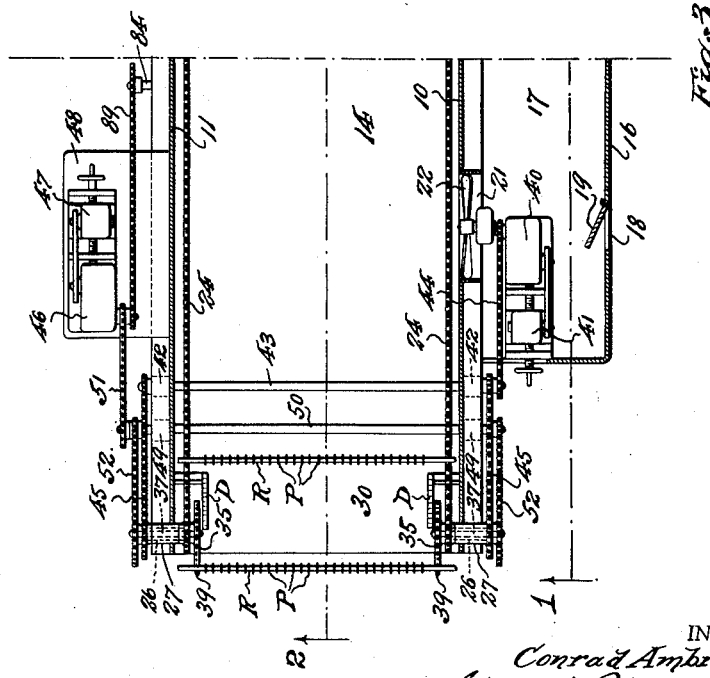
Fig. 3
INVENTOR.
Conrad Ambrette,
BY George D Richards
Attorney

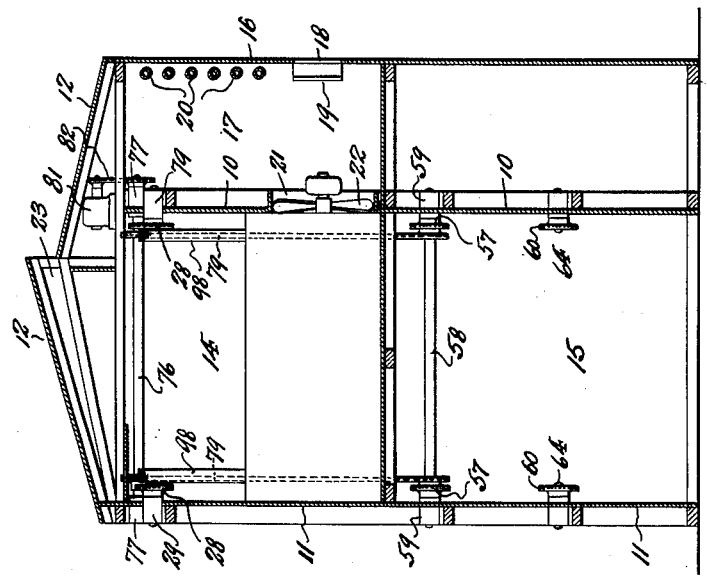
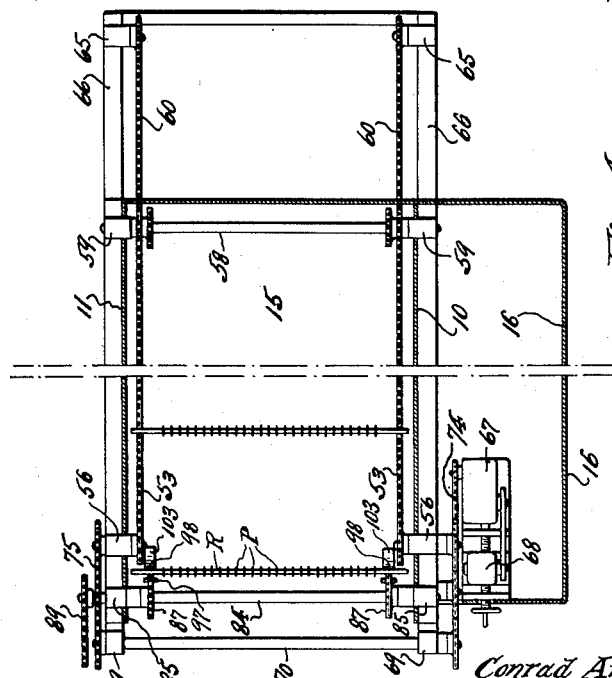

July 18, 1950 C. AMBRETTE 2,515,684
CONTINUOUS DRIER FOR LONG ALIMENTARY PASTE PRODUCTS
Filed May 14, 1946 5 Sheets-Sheet 5
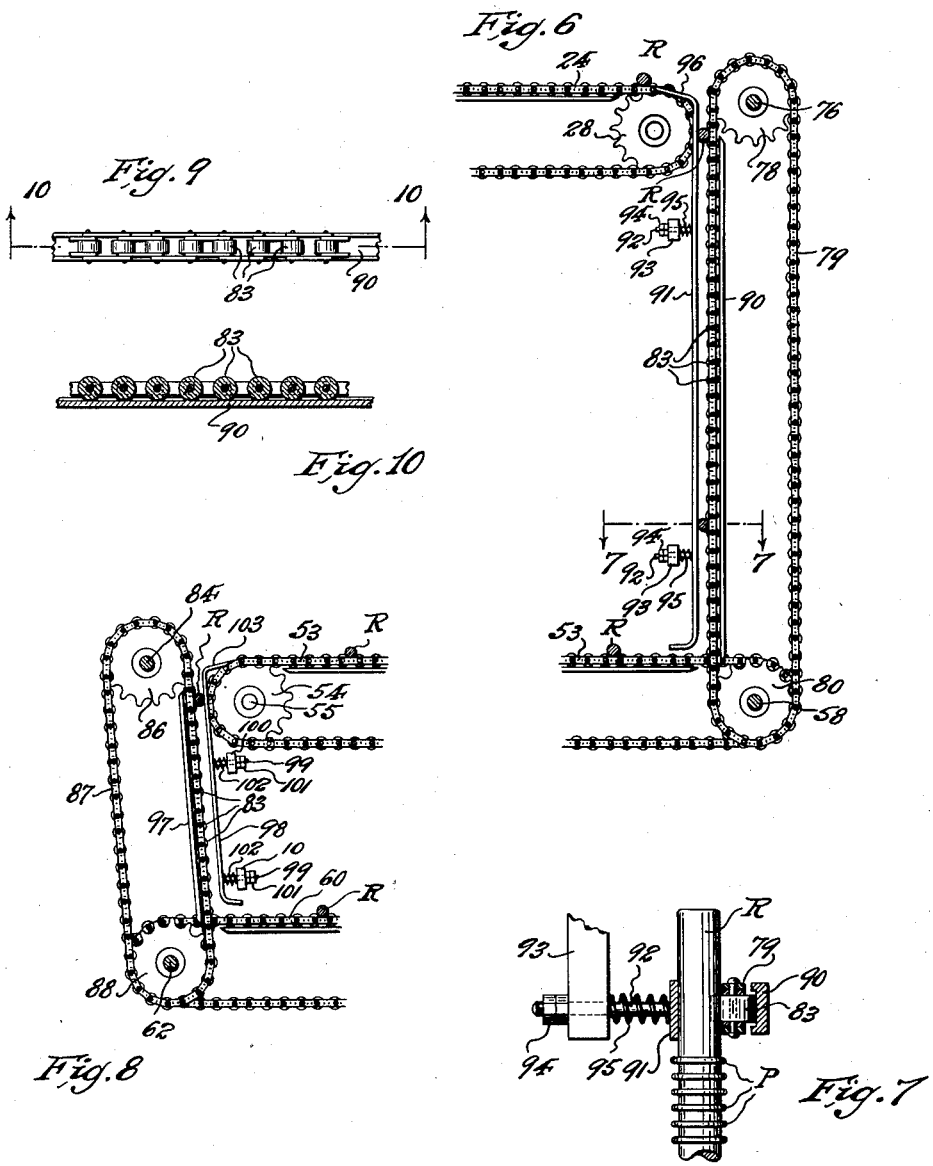
INVENTOR.
Conrad Ambrette,
BY George D. Richards,
Attorney Patented July 18, 1950

2,515,684

UNITED STATES PATENT OFFICE 2,515,684

CONTINUOUS DRIER FOR LONG ALIMENTARY PASTE PRODUCTS

Conrad Ambrette, Brooklyn, N. Y.

Application May 14, 1946, Serial No. 669,714

6 Claims. (Cl. 34—162)

This invention relates to apparatus for drying alimentary paste products, such as spaghetti, macaroni and like long forms of such products; and the invention has reference, more particularly, to a novel construction of drier apparatus, which is especially adapted for use in conjunction with continuous alimentary paste production apparatus, whereby to automatically receive the rod racked paste strings from the latter apparatus, then subject the same to drying treatment, all in synchronized relation to the output of the production apparatus, whereby to furnish an automatic and continuous process of long alimentary paste production.

The invention has for an object to provide a novel drier apparatus comprising a housing suitably subdivided to provide an initial drying chamber in its upper portion, and a second drying chamber in its lower portion; each chamber having independent conveyer means to carry rod racked paste strings therethrough, including transfer conveyers of novel construction for shifting said rod racked paste strings from the discharge end of one conveyer means to the receiving end of another conveyer means; and a delivery conveyer being provided to receive rod racked paste strings from the discharge conveyer of the paste production apparatus in conjunction with which the drier apparatus is operated and thereupon deliver the same to the receiving end of the conveyer means which serves the initial drying chamber.

The invention has for another object to provide, in drier apparatus of the kind and for the purposes stated, an independent power source and variable speed transmission for driving the conveyer means of the initial drying chamber at desired speed; a like independent power source and variable speed transmission for driving the conveyer means of the second drying chamber at desired speed; and another independent power source and variable speed transmission means for driving the delivery conveyer, which cooperates with the conveyer means of the initial drying chamber, in a properly timed and co-ordinated relation to the paste production apparatus by which the rod racked paste strings are discharged for passage through the drier apparatus.

Another object of the invention is to provide an arrangement of conveyer means for the second drying chamber which comprises an ingoing upper level conveyer to receive rod racked paste strings discharged from the initial drying chamber, and an outgoing lower level conveyer; a transfer conveyer of novel construction being provided to shift the rod racked paste strings from the discharge end of said ingoing conveyer to the receiving end of said outgoing conveyer; said transfer conveyer being operated by a suitable power source, which may be the power source and variable speed transmission which drives the delivery conveyer of the drier apparatus.

Other objects of this invention, not at this time more particularly enumerated, will be understood from the following detailed description of the same.

An illustrative embodiment of this invention is shown in the accompanying drawings, in which:

Fig. 1 is a side elevation of the drier apparatus in part section taken on line 1—1 in Fig. 3; Fig. 2 is a longitudinal vertical section taken on line 2—2 in Fig. 3; Fig. 3 is a horizontal sectional view, taken on line 3—3 in Fig. 2; Fig. 4 is another horizontal sectional view, taken on line 4—4 in Fig. 2; and Fig. 5 is a transverse vertical section, taken on line 5—5 in Fig. 1.

Fig. 6 is a detail fragmentary view, on an enlarged scale, of one side of the transfer conveyer for shifting the rod racked paste strings from the discharge end of the initial drying chamber conveyer to the receiving end of the second drying chamber conveyer; Fig. 7 is a fragmentary horizontal sectional view taken on line 7—7 in Fig. 6, and drawn on a further enlarged scale.

Fig. 8 is a detail fragmentary view, on an enlarged scale, of one side of the transfer conveyer for shifting the rod rocked paste strings from the discharge end of the ingoing conveyer of the second drying chamber to the receiving end of the outgoing conveyer of said chamber.

Fig. 9 is a fragmentary plan view, on an enlarged scale of track supported conveyer chain of the roller type; and Fig. 10 is a longitudinal section thereof, taken on line 10—10 in Fig. 9.

Similar characters of reference are employed in the above described views, to indicate corresponding parts.

Figure 1:
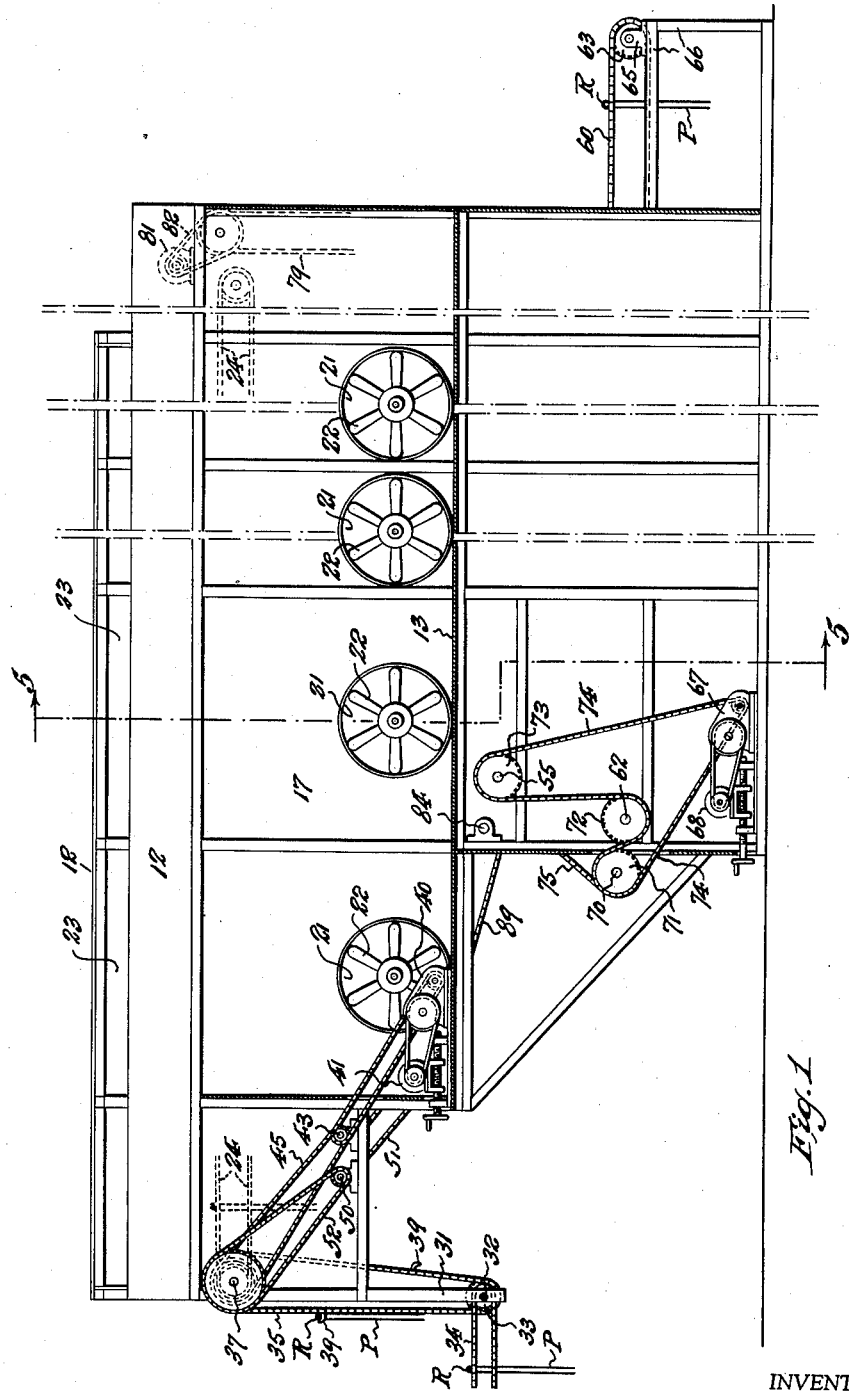
Figure 2:
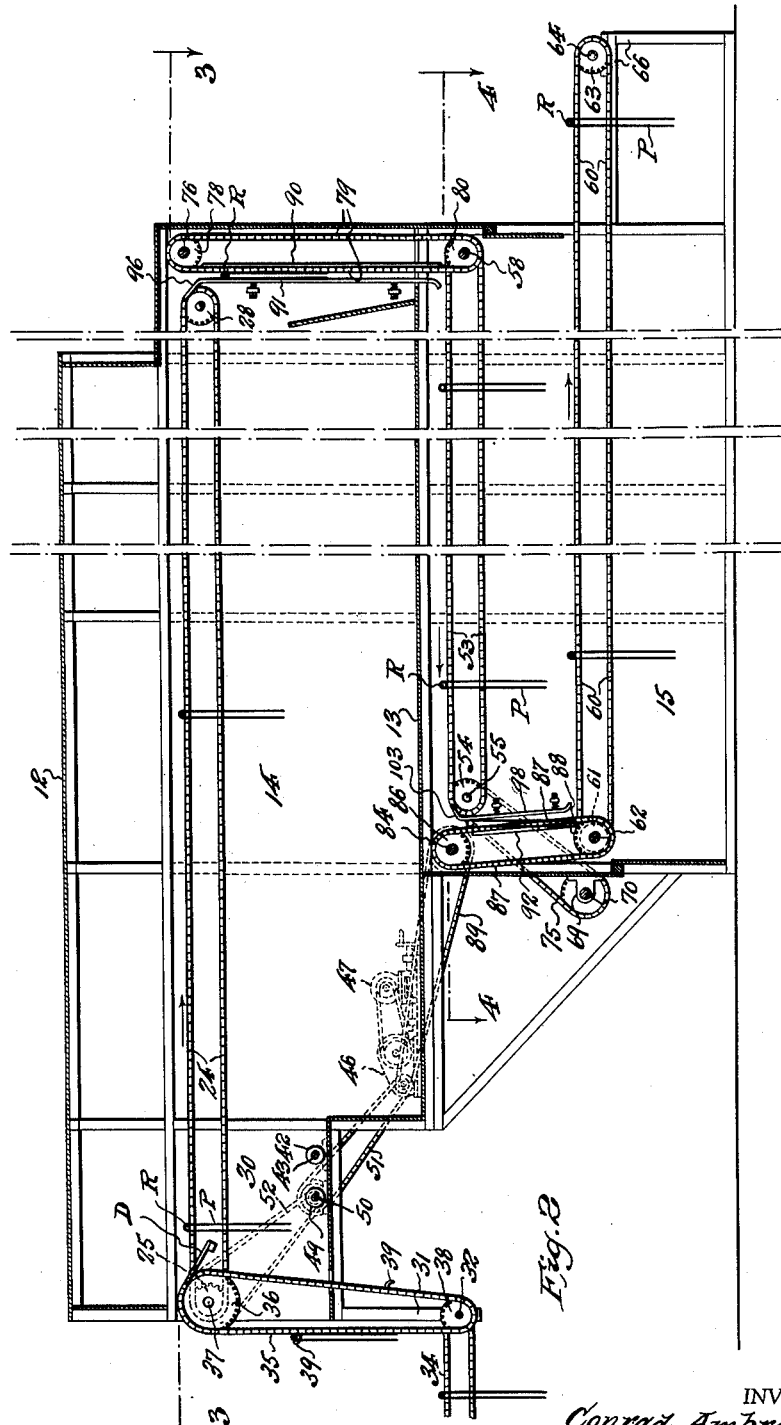

Referring to the drawings, the novel drier apparatus according to this invention comprises a suitably constructed housing or cabinet having side closure walls 10 and 11 and a roofing 12. The interior of said housing or cabinet is divided by a horizontal partition or floor 13, whereby to provide, in longitudinal extension therethrough, an upper initial drying chamber 14 and a lower second drying chamber 15. The horizontal partition or floor 13 is extended beyond the side wall 10 within an adjacent enclosure 16, whereby to provide, above the partition or floor 13 and beneath a portion of the roofing 12 an air modifying chamber 17, which extends adjacently along a side of the initial drying chamber 14, and which communicates at its top with the top of the latter as shown in Fig. 5. Said chamber 17 is provided in its exterior wall with ports 18, which communicate with the atmosphere and which may be suitably controlled by manipulatable doors 19. Suitably mounted within said air modifying chamber 17 is a source of heat for warming, when desired, the air therein, such e. g. as steam coils or pipes 20. Mounted in openings 21, which are provided in the part of said side wall 10 extending intermediate the air modifying chamber 17 and the initial driving chamber 14, are driven air impeller fans 22, by means of which air is circulated through the interior of said initial drying chamber 14. The roofing 12 is constructed to provide a suitably located opening 23 extending along the top of said initial drying chamber 14, and which communicates with the atmosphere.

Extending through the initial drying chamber 14, from end to end thereof, is a conveyer means for carrying rod racked paste strings therethrough. This conveyer means comprises a pair of sprocket supported parallel endless conveyer chains 24, which respectively border opposite sides of said initial drying chamber 14 within the upper portion thereof. The sprockets 25 which support the receiving ends of and which drive said conveyer chains 24 are fixed on short hollow drive shafts 26 which are journaled in bearings 27 suitably supported by the housing or cabinet framework. The sprockets 28 which support the discharge ends of the conveyer chains 24 are idler sprockets, the shafts of which are journaled in bearings 29 which are likewise suitably supported by the housing or cabinet framework. As thus arranged, the pair of conveyer chains 24 are spaced apart in such manner as to provide free space therebetween through which paste strings P, as dependent from supporting rack rods R (the ends of which are respectively supported and carried on and by said respective conveyer chains), may pass without obstruction or interference.

The housing or cabinet is preferably so constructed that the forward or receiving end of the initial drying chamber 14 overhangs that portion of said housing or cabinet in which the final drying chamber 15 is provided, and said forward end of the initial drying chamber is preferably reduced in height to form an outwardly open receiving vestibule section 30 from which the conveyer chains 24 extend, thence to enter the chamber 14.

Cooperative with the receiving ends of the conveyer chains 24 of said initial drying chamber 14 is a delivery conveyer means for receiving rod racked paste strings from a discharge conveyer of paste production apparatus (such e. g. as disclosed in my co-pending application Ser. No. 662,699), now Patent Number 2,481,274, and thereupon carry the same to and deliver the same successively upon the receiving ends of said conveyer chains 24 of the initial drying chamber. Dependent from said vestibule section 30 are hanger members 31 which are substantially aligned with the open end thereof. Journaled in and between the lower ends of said hanger members 31 is a shaft 32. Rotatably supported on said shaft 32 are the idler sprockets 33 which support the outer ends of endless conveyer chains 34 of the discharge conveyer means leading from a paste production apparatus from which rod racked paste strings are discharged subject to drying. Extending between said outer ends of the discharge conveyer chains 34 and the receiving ends of the conveyer chains 24 of the initial drying chamber 14 are vertically extending chains 35 of the delivery conveyer means. Said delivery conveyer chains 35 are driven by sprockets 36 which are affixed to inner ends of drive shafts 37 which are journaled in the hollow drive shafts of the driving sprockets 25 of the conveyer chains 24 of the initial drying chamber 14. These delivery conveyer chain drive sprockets 36 are positioned adjacent to and inwardly of said drive sprockets 25, and are somewhat larger in diameter than the latter. The lower ends of said delivery conveyer chains 35 are supported by idler sprockets 38, which are positioned adjacent to and inwardly of the sprockets 33 of the conveyer chains 34, and are also somewhat larger in diameter than the latter. Said delivery conveyer chains 35 are provided with a plurality of suitably spaced rack rod engaging and carrying hooks 39. Fixed deflector means D inclining from the tops of the sprockets 36 to intersect the plane of the carrying courses of the conveyer chains 24, will receive and guide the rack rods away from the hooks 39 and onto said conveyer chains.

The conveyer means of the initial chamber 14 is driven by its own power source through a speed regulator means. To this end, a regulatable variable speed transmission 40 (such e. g. as commercially known under the name "Boston Speed Reducer"), together with its electric driving motor 41, is mounted exteriorly of the initial drying chamber 14 adjacent to the forward or receiving end of the latter, as e. g. on the extension of the partitioning floor 13 within the air modifying chamber 17. Journaled in and between bearings 42, to extend transversely across the bottom interior of the initial drying chamber 14 is a lay shaft 43. Said lay shaft is driven from the regulatable variable speed transmission 40 by a sprocket and chain drive 44. Said lay shaft 43 synchronously drives the respective driving sprockets 25 of the initial drying chamber conveyer means by chain and sprocket transmission 45, which extend between said lay shaft and the respective hollow drive shafts 26 of said driving sprockets 25.

The delivery conveyer means leading to the initial drying chamber 14 and its conveyer means is driven by an independent power source through a speed regulator means. To this end, another regulatable variable speed transmission 46, similar to that above mentioned, together with its electric driving motor 47, is mounted exteriorly of the opposite side of said initial drying chamber 14 adjacent to the forward or receiving end of the latter, as e. g. upon a platform 48 which is affixed to and which projects from the framework of the housing or cabinet. Also journaled in and between bearings 49, to extend across the bottom interior of the initial drying chamber 14 is a second lay shaft 50. Said second lay shaft 50 is driven from the regulatable variable speed transmission 46 by a sprocket and chain drive 51. Said second lay shaft 50 synchronously drives the respective driving sprockets 36 of the delivery conveyer chains 35 by chain and sprocket transmission 52, which extend between said second lay shaft and the drive shafts 37 of said driving sprockets 36.

Extending through the second drying chamber 15, from end to end thereof, is an upper ingoing conveyer means for moving the rod racked paste strings in inward direction through the upper portion or level thereof. This conveyer means also comprises a pair of sprocket supported parallel endless conveyer chains 53, which respectively border opposite sides of said second drying chamber 15. The sprockets 54 which support the inner or discharge ends of and which drive said conveyer chains 53 are fixed on short shafts 55 which are journaled in bearings 56 suitably supported by the housing or cabinet framework. The sprockets 57 which support the outer or receiving ends of the conveyer chains 53 are idler sprockets, rotatably mounted on a transverse shaft 58 which is journaled in and between bearings 59, likewise suitably supported by the housing or cabinet framework. As thus arranged, the pair of conveyer chains 53 are spaced apart in such manner as to provide free space therebetween, and between their driving sprockets 54, through which paste strings P, as dependent from rack rods R which straddle said conveyer chains, may pass without obstruction or interference.

Also extending through the second drying chamber 15, and outwardly from the rear end thereof, is a lower outgoing conveyer means for moving the rod racked paste strings in outward direction through the lower portion or level of said final drying chamber, and thereupon finally discharging the same from the dried apparatus. Said lower outgoing conveyer means comprises a pair of sprocket supported parallel endless conveyer chains 60, which respectively border opposite sides of the second drying chamber. The sprockets 61, which support the inner or receiving ends of and which drive said conveyer chains 60, are fixed on a suitably journaled transverse shaft 62. The sprockets 63, which support the outer or discharge ends of the conveyer chains 60, are idler sprockets, the short shafts 64 of which are journaled in bearings 65 mounted on a supporting framework 66 which extends exteriorly from the rear or discharge end of the housing cabinet.

The upper and lower conveyer means of the second drying chamber 15 are synchronously driven by an independent power source and speed regulator means. To this end, a regulatable variable speed transmission 67, such as hereinbefore mentioned, together with its electric driving motor 68, is mounted exteriorly of the second drying chamber 15 in a suitable location, preferably adjacent to the inner or forward end of the latter. Journaled in and between bearings 69, to extend transversely across the housing or cabinet adjacent to said inner or forward end of the second drying chamber, is a lay shaft 70. Affixed on the end of said lay shaft 70, which is adjacent to the regulatable variable speed transmission 67, is a sprocket 71. Affixed to the adjacent end of the transverse shaft 62 is a drive sprocket 72, and affixed to the short shaft 55 of the sprocket 54 of the adjacent upper chain 53 is another drive sprocket 73. A transmission chain 74, which is driven by said variable speed transmission 67, extends therefrom over said drive sprocket 73, thence over the drive sprocket 72, thence over the lay shaft sprocket 71 and back to said variable speed transmission. The opposite end of the lay shaft 70 drives the drive sprocket of the opposite upper conveyer chain 53 through a sprocket and chain transmission 75.

Cooperative with the discharge ends of the conveyer chains 24 of the initial drying chamber 13, so as to descend therefrom to the receiving end of the upper conveyer chains 53 of the second drying chamber 15, is a transfer conveyer means of novel construction which is adapted to carry the rod racked paste strings from said initial drying chamber to said second drying chamber for movement through the latter. Said transfer conveyer means comprises a transverse drive shaft 76 which is journaled in and between bearings 77, supported in connection with the housing or cabinet framework, to extend across the upper rear end portion of the initial drying chamber 14, in outwardly spaced relation to the discharge ends of the conveyer chains 24. Fixed on said drive shaft are sprockets 78 over which run transfer conveyer chains 79, the descending courses of which are disposed adjacent to the discharge ends of said conveyer chains 24 of the initial drying chamber. The lower ends of said transfer conveyer chains 79 are supported by idler sprockets 80 which are rotatably mounted on the transverse shaft 58 inwardly of the sprockets 54 which support the receiving ends of the upper ingoing conveyer chains 53 of the second drying chamber 15. Said drive shaft 76 and the transfer conveyer chains 79 are driven, at constant speed, by a suitable power source, such e. g. as an electric motor 81, by means of sprocket and chain transmission 82.

Said transfer chains 79 are of the roller type, i. e. the linkage thereof supports spaced rollers 83 (see more particularly Figs. 6 to 10 inclusive). The spacing of said rollers 83 is such as to permit rack rods R to be supportedly engaged between the outer side of adjacent rollers. The inward sides of the rollers 83 of the descending carrying courses of the transfer chains 79 are supported by and ride against perpendicular track members 90, whereby said descending carrying courses are unyieldingly backed against deflection from a straight descending path of movement. Opposed to the outer faces of said descending courses of the transfer chains 79, in parallel relation thereto, and spaced therefrom a distance substantially equivalent to the diameters of rack rods R by which the paste strings P are carried, are keeper bars 91. These keeper bars 91 are supported in properly spaced opposed relation to the transfer chains 79 by stud rods 92 which extend slidably through fixed brackets 93. Adjustable on the ends of said stud rods 92 are stop nuts 94 which limit movement of the keeper bars toward the transfer chains, under the thrust of compression springs 95 which are mounted on said stud rods 93 between the backs of the keeper bars and said brackets 93, while nevertheless allowing said keeper bars to yield outwardly, whereby to readily accommodate themselves to the rack rods R, when the latter engage between the same and the transfer chains 79. The upper ends of the keeper bars 91 terminate in rearwardly extending and upwardly inclined guide portions 96, over which rack rod ends discharging from the conveyer chain 24 may ride, so as to be guided into place intermediate the keeper bars and transfer chains.

As the rack rod ends leave the conveyer chains 24, the same will be guided into positions whereby they are supportedly seated between adjacent rollers 83 of the transfer chains 79, so as to be held in such supported seated relation thereto by the engagement of their opposite sides by the keeper bars 91. The ends of said rack rod being thus engaged by the keeper bars 91 and the descending course of the transfer chains 79, the downward movement of the latter will be transmitted to the rack rod, whereby the latter, and the paste strings P carried thereby, will be carried downward to and then deposited upon the receiving ends of the ingoing conveyer chains 53, by which the same are started through the second drying chamber 15. During such transfer of the string loaded rack rods, said rods will not be rotated so as to risk run off of the supported strings, for by the time the loaded rack rods, after traversing the upper drying chamber, reach the end of the conveyer therein, the paste strings will have hardened sufficiently under initial drying to acquire considerable stiffness and consequent loss of flexibility. Due to lack of flexibility of the strings and the considerable weight of the number of strings carried on a rack rod there is set up substantial resistance to rod rotation. Furthermore, since there is but limited areas of contact of the rollers 83 and of the members 91 with the rod end portions, the rollers readily tend to slip relative to said rod end portions, and the latter will slip relative to the members 91, and consequently tendency of the rods to rotate will be effectively resisted.

Similarly, cooperative with the inner discharge ends of the ingoing conveyer chains 53 of the second drying chamber 15, so as to descend therefrom to the receiving ends of the conveyer chains 60 of the outgoing conveyer in said second drying chamber 15, is a second transfer conveyer means adapted to carry the rod racked paste strings from said upper ingoing to said lower outgoing conveyer. Said second transfer conveyer means comprises a transverse drive shaft 84 which is journaled in and between bearings 85 supported in connection with the housing or cabinet framework, to extend across the upper forward end portion of the second drying chamber 15, in outwardly spaced relation to the discharge ends of the ingoing conveyer chains 53. Fixed on said drive shaft 84 are sprockets 86 over which run transfer conveyer chains 87, the descending courses of which are opposed to the discharge ends of said ingoing conveyer chains 53. The lower ends of said transfer conveyer chains 87 are supported on idler sprockets 88 which are rotatably mounted on the transverse shaft 62 inwardly of the sprocket 61 which support the receiving ends of the lower outgoing conveyer chains 60. Said drive shaft 84 and the transfer conveyer chains 87 are driven by sprocket and chain transmission 89 from a suitable power source, which (as shown) may be the regulatable variable speed transmission means 46.

Said transfer conveyer chains 87 are also of the roller type, i. e. equipped with spaced rollers 83. Cooperative with the descending courses of the conveyer chains 87 are track members 97 which back the same, and opposed to said descending courses of the conveyer chains 87 are outwardly spaced parallel keeper bars 98, which are yieldably supported by their stud rods 99, which in turn are slidably supported in stationary brackets 100. Said stud rods are provided with adjustable stop nuts 101, and the keeper bars 98 are yieldably urged to forward operative positions by compression springs 102 which are mounted on the stud rods. The upper ends of the keeper bars 98 terminate in rearwardly extending and upwardly inclined guide portions 103 over which the rack rod ends discharging from the conveyer chains 53 may ride, so as to be guided into place intermediate the keeper bars 98 and conveyer chains 87. It will thus be understood that the transfer conveyer which is operative between the conveyers of the second drying chamber are of the same construction and function in the same manner, as already above described in connection with the transfer conveyer which is operative between the conveyers of the initial and second drying chambers.

The conveyer chains 24, 53, and 60 may also be of the roller chain type, and if desired their carrying course may be supported track members, similar to the track members 90 of the transfer conveyer chains.

The descending courses of said transfer conveyer chains 87 carry the rack rod loaded paste strings P downwardly so as to deliver the same upon the receiving ends of the outgoing conveyer chains 60, by which the same are carried outwardly through the second drying chamber 15, and thence outwardly from the latter, whereupon the same may be removed from the exterior discharge ends of said conveyer chains 60, for final drying treatment in one or more succeeding driers (not shown), similar to that hereinabove described, or otherwise as may be desired.

In the operation of the drying apparatus, the rack rods R, as loaded with dependent paste strings P by a continuous paste production apparatus and discharged therefrom, are carried to the delivery conveyer means, the rising course of the chains 35 of which engage the rods ends, by carrying hooks 39 thereof, and thus successively carry the loaded rods upwardly to and then deposit the same upon the conveyer chains 24 which travel through the initial drying chamber 14. While passing through the initial drying chamber 14, suitably modified air is circulated through said chamber in contact with the paste strings traveling therethrough. Said air currents operate to absorb and carry off moisture from the paste strings. The circulated air may be selectively managed as to various sections or zones of said initial drying chamber 14, by use of the dampers 19 and fans 22, so that the drying process may be controlled in such manner as to prevent surface hardening and checking of the paste strings. As the paste string loaded rack rods reach the discharge end of the initial drying chamber 14, the same move off the discharge ends of the conveyer chains 24 into engagement with rollers 83 of the transfer conveyer chains 79, so as to be carried downwardly by the latter into the second drying chamber 15, and then deposited upon the ingoing conveyer chains 53. The paste string loaded rack rods are thereupon moved inwardly through the still air within the second drying chamber 15, whereby to permit moisture within the interior of the paste strings to work toward the surface, so that moisture remaining in the strings is uniformly distributed in the mass thereof, this process being continued as the strings are transferred from said ingoing conveyer chains 53 thereof, by the transfer conveyer chains 87, to the outgoing conveyer chains 60, for continued but now outward movement through the second drying chamber, and ultimate discharge from the drier apparatus. The speed of travel of the racked paste strings through the second drying chamber may be so regulated that sufficient time is allowed to permit the moisture within the paste strings to become uniformly distributed through the mass thereof so that by the time said paste strings are finally discharged from the drier apparatus, the same are then ready for Such final drying treatment as may be necessary or desirable.

To allow sufficient time for equalizing distribution of the moisture content of the paste, the conveyers of the second drying chamber 15 may be run at a slower speed than that at which the conveyer of the initial chamber operates. For example, assume that the paste supporting rods are deposited on the conveyer chains 24 of the initial drying chamber, when latter chains are running at a selected speed, are spaced three inches apart, then if speed of the conveyers of the second drying chamber is relatively slowed, the transferred rod racked paste strings will be deposited upon the latter conveyers in more closely spaced relation, say one and one-half inches apart. Such close spacing permits a relatively slow speed of movement through the second drying chamber, and yet does not obstruct or interfere with continuous discharge of the rod racked paste strings from the conveyer of the initial drying chamber. Ordinarily the operations are so timed and related, that exposure of the paste strings P in the still air of the second drying chamber endures for a period of time approximately twice the time the same are exposed to the circulated modified air of the initial drying chamber, thus providing a sufficiently long rest period as will assure attainment of a satisfactory uniform distribution of the moisture content of the strings by the time they emerge from the second drying chamber.

It may be here pointed out, that due to the fact that in transferring the rod racked paste strings from one conveyer to another, especially from the initial drying chamber conveyer means to the second drying chamber conveyer means, the rods may be grasped between any particular pair of rollers 33 which happen to present themselves at the moment of discharge from a conveyer, there is no necessity of precise coordination of transfer conveyer speed to drying chamber conveyer speed, and consequently the transfer conveyer may be run at a constant speed, regardless of regulated variation of speeds of the drying chamber conveyers. This is of great importance, since it permits a wide range of relative drying chamber conveyer speeds, not otherwise possible to be attained.

By reason of the provision of the independent power source and regulatable variable speed transmission 47—46, by which the delivery conveyer chains 35 are driven, the speed of the latter may be precisely accommodated to properly cooperate with the output rate of paste string loaded rack rods from the continuous paste production apparatus by which the drier apparatus is served.

Since the conveyer means of the initial drying chamber 14 is independently driven by its own power source and regulatable variable speed transmission 41—40, the speed of movement of the paste string loaded rack rods through the initial drying chamber may be regulated at will to that best adapted to attain the desired initial drying effects. Since the conveyer means of the second drying chamber 15 is likewise independently driven by its own power source and regulatable variable speed transmission 67—68, the speed of movement of the paste string loaded rack rods through the second drying chamber 15 may be likewise regulated at will to that best adapted to consummate preliminary drying effects.

It will also be obvious that by their independent speed controlled driving power, the conveyer means of the respective drying chambers, as well as the delivery conveyer may be easily brought into efficient coordinated running relations, whereby to assure automatic and continuous movement of paste strings through the drier apparatus with accompanying desired treatment thereof under circulated air and still air phases of such treatment.

Having now described my invention, I claim:

1. A continuous drier apparatus for the purposes described comprising a housing horizontally subdivided to provide an upper drying chamber to be provided with circulated drying air and a lower drying chamber containing still air, said upper drying chamber having in the top thereof an opening substantially coextensive with the length thereof which is open to the atmosphere, a separate air treating chamber substantially coextensive with a side of the upper drying chamber, air warming means within said treating chamber, means coextensive with the lengths of said upper drying and air treating chambers adapted to provide communication between the upper levels thereof, the wall intermediate said upper drying and air treating chambers having longitudinally spaced air ports to provide communication between the lower levels of said chambers, air impeller fans at said air ports operative to circulate air through and between said upper drying and air treating chambers, an exterior wall of said air treating chamber having air ports in communication with the atmosphere and manipulatable control doors cooperative therewith, and conveyer means for continuously moving rod racked paste strings successively through said upper and lower drying chambers for discharge from the latter including means to transfer the rod racked paste strings from one chamber to the other.

2. A continuous drier apparatus as defined in claim 1 wherein that portion of the conveyer means within the lower drying chamber includes an upper ingoing section within the upper part of said chamber and a lower outgoing section within the lower part of said chamber spaced below said upper section and means to transfer the rod racked paste strings from said upper section to said lower section.

3. In a continuous drier apparatus for purposes described having an upper drying chamber, a lower drying chamber and an air treating chamber contiguous to the length of the upper drying chamber and means for circulating drying air through and between the upper drying chamber and treating chamber; said upper and lower drying chambers each having longitudinally extending driven conveyer means therein, each conveyer means comprising laterally spaced endless conveyer chains adapted to be bridged by rod racked paste strings for movement thereby through said respective chambers, and means for transferring the rod racked paste strings from the discharge end of the conveyer means of the upper drying chamber to the receiving end of the conveyer means of the lower drying chamber, said transfer means comprising continuously driven laterally spaced perpendicular endless conveyer chains of the roller type having their rollers spaced so that any two adjacent rollers will straddle rack rod end portions opposed to descending courses thereof, keeper bars opposed to said descending courses of said conveyer chains in parallel spaced relation thereto, whereby to engage said rack rod end portions and hold the same in supported engagement by the rollers, and said keeper bars having means to guide said rack rod end portions into engagement with descending courses of said conveyer chains.

4. In a continuous drier apparatus for the purposes described having an upper drying chamber, a lower drying chamber and an air treating chamber contiguous to the length of the upper drying chamber and means for circulating drying air through and between the upper drying chamber and treating chamber; said upper and lower drying chambers each having longitudinally extending driven conveyer means therein, each conveyer means comprising laterally spaced endless conveyer chains adapted to be bridged by rod racked paste strings for movement thereby through said respective chambers, and means for transferring the rod racked paste strings from the discharge end of the conveyer means of the upper drying chamber to the receiving end of conveyer means of the lower drying chamber, said transfer means comprising continuously driven laterally spaced perpendicular endless conveyer chains of the roller type having their rollers spaced so that any two adjacent rollers will straddle rack rod end portions opposed to descending courses thereof, keeper bars opposed to said descending courses of said conveyer chains in parallel spaced relation thereto, whereby to engage said rack rod end portions and hold the same in supported engagement by the rollers, said keeper bars having means to guide said rack rod end portions into engagement with descending courses of said conveyer chains, and means to yieldably support the keeper bars in predetermined spaced relation to said descending courses of the conveyer chains.

5. In a continuous drier apparatus for the purposes described having an upper drying chamber, a lower drying chamber and an air treating chamber contiguous to the length of the upper drying chamber and means for circulating drying air through and between the upper drying chamber and treating chamber; a longitudinally extending driven conveyer means in said upper drying chamber comprising laterally spaced endless conveyer chains adapted to be bridged by rod racked paste strings for movement thereby through said upper drying chamber, a conveyer means in said lower drying chamber formed by an ingoing section running in its upper level and an outgoing section running through its lower level and outwardly therefrom, each said section comprising laterally spaced endless conveyer chains adapted to be bridged by the rod racked paste strings, means for transferring the rod racked paste strings from the discharge end of the conveyer means of the upper drying chamber to the receiving end of the ingoing section of the conveyer means of the lower drying chamber, additional means for transferring the rod racked paste strings from the discharge end of the ingoing section to the receiving end of the outgoing section of the conveyer means of the lower drying chamber, each said transfer means comprising continuously driven laterally spaced perpendicular endless conveyer chains of the roller type having their rollers spaced so that any two adjacent rollers will straddle rack rod end portions opposed to descending courses thereof, keeper bars opposed to descending courses of said conveyer chains in parallel spaced relation thereto, whereby to engage rack rod end portions and hold the same in supported engagement by rollers of said conveyer chains, and said keeper bars having means to guide said rack rod end portions into engagement with decending courses of the conveyer chains.

6. In a continuous drier apparatus for the purposes described having an upper drying chamber, a lower drying chamber and an air treating chamber contiguous to the length of the upper drying chamber and means for circulating drying air through and between the upper drying chamber and treating chamber; a longitudinally extending driven conveyer means in said upper drying chamber comprising laterally spaced endless conveyer chains adapted to be bridged by rod racked paste strings for movement thereby through said upper drying chamber, a conveyer means in said lower drying chamber formed by an ingoing section running in its upper level and an outgoing section running through its lower level and outwardly therefrom, each said section comprising laterally spaced endless conveyer chains adapted to be bridged by the rod racked paste strings, means for transferring the rod racked paste strings from the discharge end of the conveyer means of the upper drying chamber to the receiving end of the ingoing section of the conveyer means of the lower drying chamber, additional means for transferring the rod racked paste strings from the discharge end of the ingoing section to the receiving end of the outgoing section of the conveyor means of the lower drying chamber, each said transfer means comprising continuously driven laterally spaced perpendicular endless conveyer chains of the roller type having their rollers spaced so that any two adjacent rollers will straddle rack rod end portions opposed to descending courses thereof, keeper bars opposed to descending courses of said conveyer chains in parallel spaced relation thereto, whereby to engage rack rod end portions and hold the same in supported engagement by rollers of said conveyer chains, said keeper bars having means to guide said rack rod end portions into engagement with descending courses of the conveyer chains, and means to yieldably support the keeper bars in predetermined spaced relation to said descending courses of the conveyer chains.

CONRAD AMBRETTE.

REFERENCES CITED

The following references are of record in the file of this patent:

UNITED STATES PATENTS

| Number | Name | Date |
|---|---|---|
| 675,070 | Sargent | May 28, 1901 |
| 881,602 | Marr | Mar. 10, 1908 |
| 1,217,439 | Gallerani | Feb. 27, 1917 |
| 1,312,348 | Ogle | Aug. 5, 1919 |
| 1,771,906 | Villemey | July 29, 1930 |
| 1,822,313 | Quiggle | Sept. 8, 1931 |
| 1,966,405 | Galson | July 10, 1934 |
| 2,074,458 | Cavagnaro | Mar. 23, 1937 |
| 2,152,312 | Jennings | Mar. 28, 1939 |
| 2,395,933 | McBeth | Mar. 5, 1946 |